Jan. 13, 1959 A. C. PETERSON 2,868,302
AUXILIARY ROTOR AIR FOIL MEANS
Filed Sept. 7, 1955 3 Sheets-Sheet 3
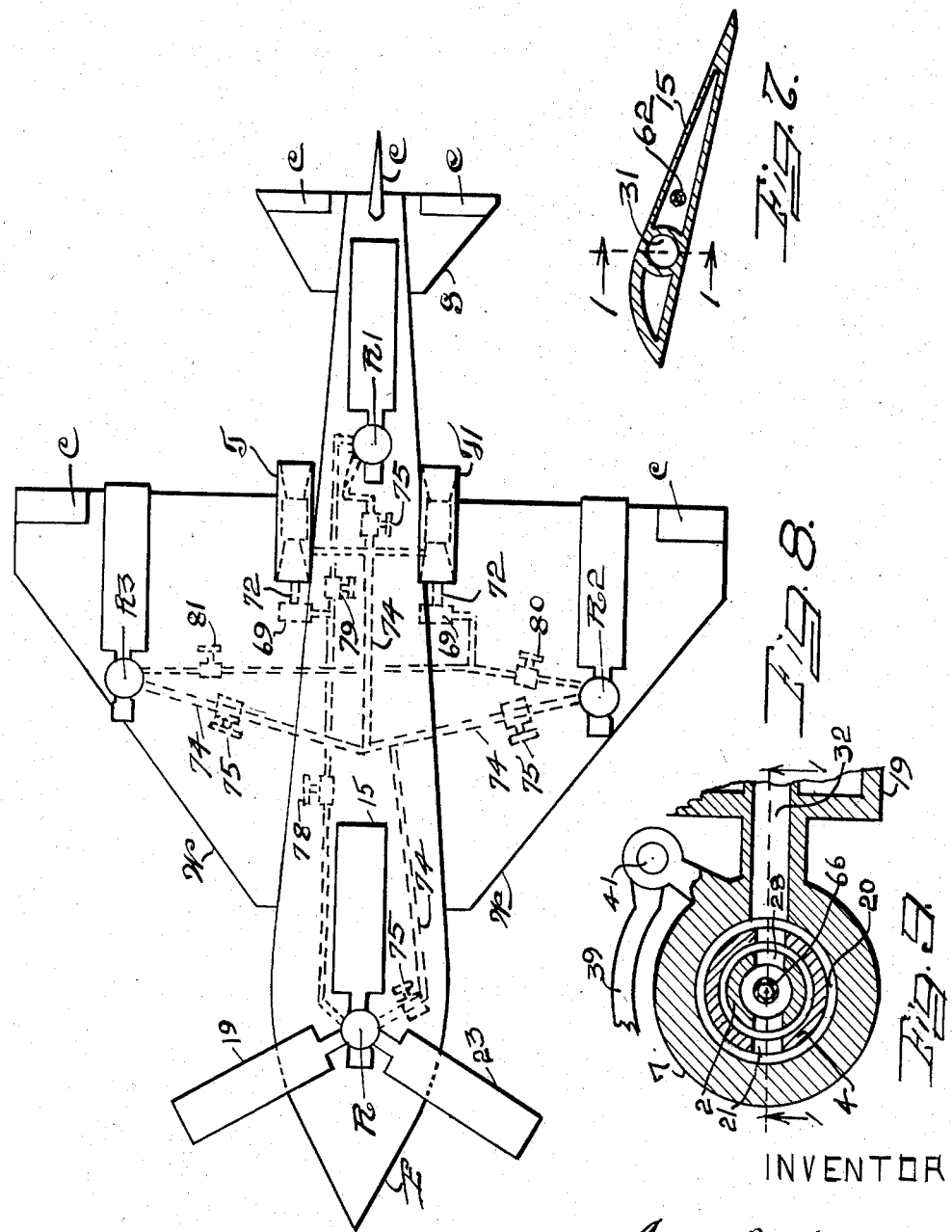
INVENTOR
Adolphe C. Peterson

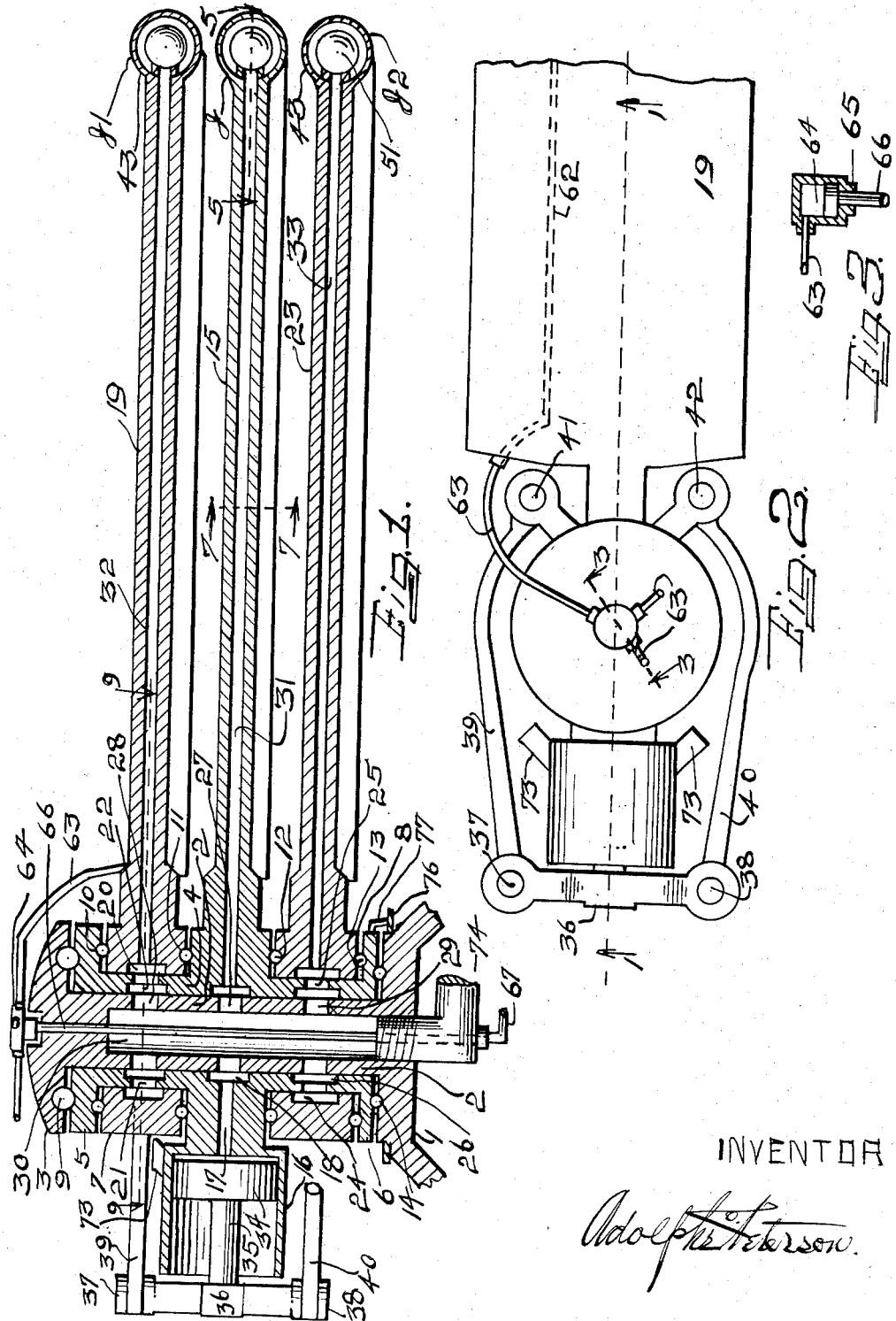

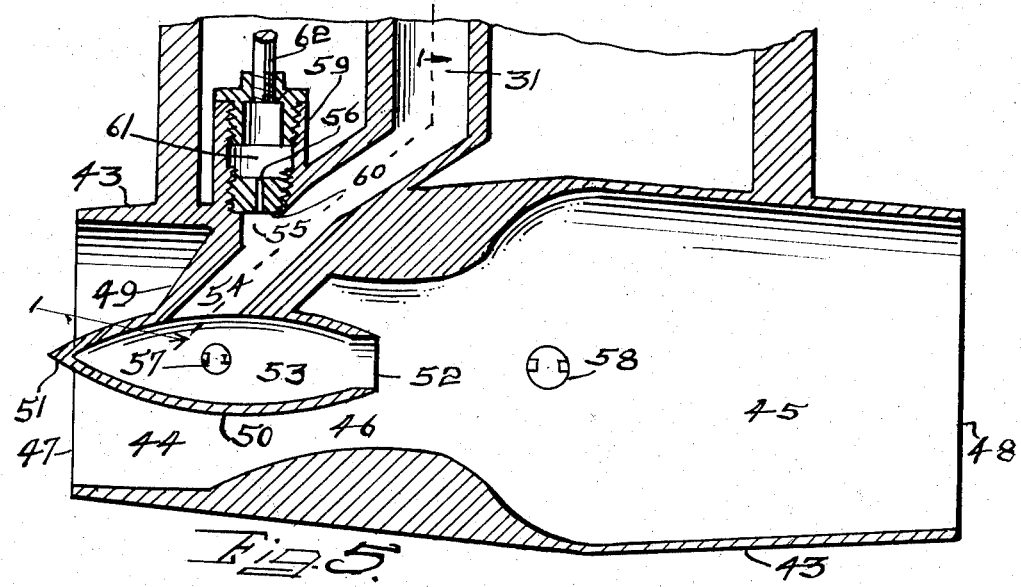
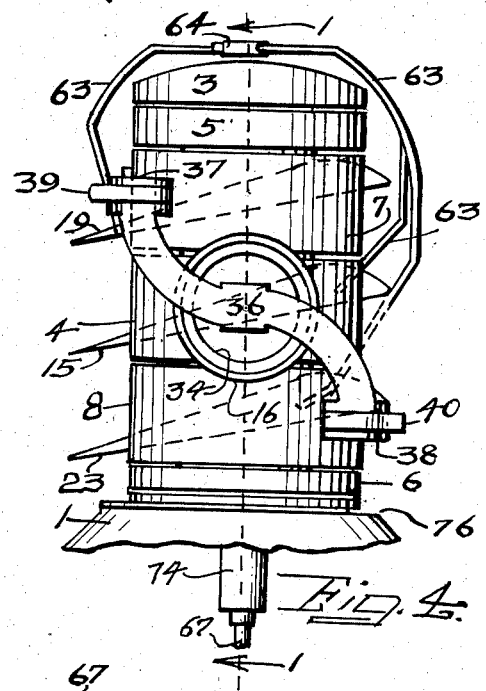
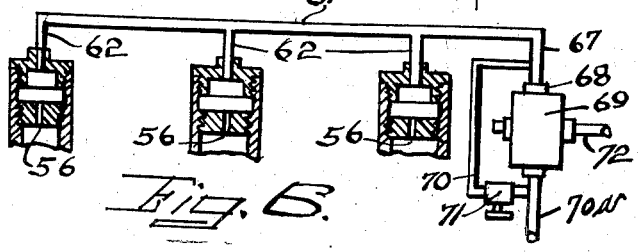

United States Patent Office 2,868,302
Patented Jan. 13, 1959

2,868,302

AUXILIARY ROTOR AIR FOIL MEANS

Adolphe C. Peterson, Minneapolis, Minn.

Application September 7, 1955, Serial No. 532,851

9 Claims. (Cl. 170—135.4)

My invention relates to rotary airfoil means for aircraft and this invention relates especially to such a means as will generally be an auxiliary or supplemental sustentation means for aircraft, and it is therefore called auxiliary rotor airfoil means.

The chief objects of my invention are to provide such a means for aircraft in a form such that it is simple in construction, simple in its power operation, reliable in its operation, easily controlled to have one or the other of its conditions in use. A principal object is to provide such a means such that it has the ability to readily expand into its operational condition, and also the ability to readily take its inoperative position, and to provide it in connection with the power means for rotating the rotor in such a manner that that power means is readily effective to automatically place the rotor in its operative condition, and at the same time provide power for rotation of the rotor. In this connection it is provided also, as an objective, that the control for so placing the rotor and for its rotation is a single control, effecting those objects. The object is to provide a means such that one fluid power source is effective to provide for both the effective expansion of the rotor into an operating condition and is also effective to power a form of jet means for the power propulsion of the rotor for sustentation by the incorporated airfoil blades. Auxiliary rotor means are effective to provide supplementary sustentation for an aircraft of the fixed wing type, so that such an aircraft may have ability for slow forward flight while at the same time being slowly lowered for landing, and such means are effective also for take-off of an aircraft, so that short air-landing fields or platforms are sufficient, and it is an object to provide a means for aircraft such that these abilities are provided in an aircraft of a so-called convertible type, and that they are provided in a means which can effectively perform such a service, and that the means for such provision of such service for the aircraft is not a too complicated or heavy an apparatus. In general the object is to provide an improved means for rotor airfoil landing and take-off of aircraft and an improved convertible type aircraft.

The principal devices and combinations of devices comprising my invention are as hereinafter described, and as more particularly defined in the claims. In the accompanying drawings, which illustrate my invention, like characters refer to like parts throughout the views.

Referring to the drawings:

Figure 1 is a view chiefly in vertical section through the axis of rotation of the rotor and through the principal component parts of the rotor means and control means, some parts being in full elevation, some parts broken away, the section being on the lines 1—1 of Figures 2 and 4.

Figure 2 is a plan view of the rotor shown in Figure 1, some parts, notably the blades and certain pipes, being broken away.

Figure 3 is a detail sectional view through the fuel distributing element, to show its rotation on a vertical pipe.

Figure 4 is a frontal elevation view of the rotor means shown in Figures 1, 2, the pylon supporting means being broken away.

Figure 5 is a horizontal section on the line 5—5 of Figure 1 showing only the extreme end of the intermediate air foil blade and the jet means attached to that end in section, some parts being shown in plan view. A similar section through the jet means of the other airfoil blades of the rotor would be similar and are therefore not shown.

Figure 6 is a somewhat diagrammatic representation of the fuel supply means for the jet means of the rotor, the several fuel metering nozzles being shown in section.

Figure 7 is a view in section transversely of a rotor airfoil blade on the line 7—7 of Figure 1, similar sections through the other airfoil blades being similar and therefore not shown.

Figure 8 is a diagrammatic plan view of an aircraft having incorporated therewith four of such rotors as are shown specifically in Figures 1 to 7, inclusive, the rotors being here shown diagrammatically only.

Figure 9 is a detail section transversely of the axis of the hub 7 to show its pivotable connection to the associated connecting link. The hub 8 is similarly connected to its associated connecting link, but on the opposite side of the axis of the main rotor hub 4.

Referring to the figures from 1 to 7, both inclusive, which illustrate one rotor means having my invention, these figures show a frame fixture 1 which is a part of an aircraft for mounting the rotor, a rotor pylon shaft 2 fixed on the frame fixture 1 to have a substantially vertical axis, a bearing head 3 fixed on the top of the rotor pylon shaft 2 and against which the rotor may bear upwardly, a main rotor bearing hub 4 of rather large diameter having an upper flange 5 and a lower flange 6 each concentric with it and having an internal bore just sufficiently large in diameter so that it may have free rotation on the exterior bearing surface of the rotor pylon shaft 2 on which it is mounted rotatably, an upper air foil hub 7 having an internal bore which is cylindrical and just sufficiently large so that it may rotate on the exterior cylindrical surface of the rotor bearing hub 4 on which it is mounted above the intermediate section thereof, and a lower air foil hub 8 having an internal bore which is cylindrical and just sufficiently large in diameter so that it may rotate on the exterior cylindrical surface of the rotor bearing hub 4 on which it is mounted below the intermediate section thereof. A large ball bearing 9 is placed between the upper side of the flange 5 and the lower side of the bearing head 3 to provide relatively frictionless bearing of the main rotor bearing hub 4 upwardly against the bearing head 3. Smaller ball bearings 10, 11, 12, 13, and 14, respectively, are placed between the hubs and between the lower face of the flange 6 and the upper face of the frame fixture 1, in the positions indicated to provide relatively frictonless bearing on the parts against each other, so that there may be free rotation, subject to the elements hereinafter described.

The main rotor hub 4 has affixed to it or formed with it as shown, two elements which are located at diametrically opposite points of the circle about the main rotor hub 4 and one of these is an air foil blade 15 extending horizontally from it substantially as a radius of the circle about the hub, and the other is a control cylinder 16 which extends horizontally from the main rotor hub 4 substantially so that its axis is a radius of the circle about the hub. The control cylinder 16 is open at its radially outward end, is closed at the inner end nearest the axis of the shaft 2, but has a passage 17 connecting the bore of the cylinder 16 with the annular chamber 18 formed in the main rotor hub 4. The upper air foil hub 7 has affixed to it or formed with it an air foil or air foil blade 19 which extends horizontally from the hub and substantially as a radius of the circle about the hub and this hub 7 has also an internal annular chamber 20 which is formed internally of the hub and is in permanent connection through ports 21 formed in the main rotor hub 4 with an annular chamber 22 formed internally of the main rotor hub 4. The lower air foil hub 8 has affixed to it or formed with it an air foil or air foil blade 23 which extends horizontally from the hub and substantially as a radius of the circle about the hub and this hub 8 has also an internal annular chamber 24 which is formed internally of the hub and is in permanent connection through ports 25 formed in the main rotor hub 4 with an annular chamber 26 formed internally of the main rotor hub 4. The three annular chambers 18, 20, and 24 each have permanent and separate communication by way of ports 27, 28, and 29, respectively, with an internal bore 30 (conduit) formed internally and axially of the rotor pylon shaft 2, so that there is thus permanent and free communication for flow of air as herinafter described between the internal conduit 30 and the several annular chambers 18, 20, 24.

The annular chamber 18 is in permanent communication with an air conduit 31 formed in the air foil (blade) 15 and extending from the annular chamber 18 and to the jet propulsion unit, as hereinafter described. The annular chamber 20 is in permanent communication with an air conduit 32 formed in the air foil (blade) 19 and extending from the annular chamber 20 and to the jet propulsion unit associated, as hereinafter described. The annular chamber 24 is in permanent communication with an air conduit 33 formed in the air foil (blade) 23 and extending from the annular chamber 24 and to the associated jet propulsion unit, as hereinafter described. The annular chamber 18 is also in permanent communication with the bore of control cylinder 16, as stated.

The control cylinder 16 has reciprocable in it, along its horizontal axis, a piston 34 which has an attached piston rod 35 which extends horizontally and radially of the hub unit from it, and which has affixed to its outer end a transverse beam member 36 which at its opposite ends has formed thereon pivot pins 37, 38, on which are pivotally mounted the associated ends of connecting rods 39, 40, respectively, and the latter named rods are pivotally mounted, one on a bracket bearing pin 41 mounted on the upper hub 7 and the other on a bracket bearing pin 42 mounted on the lower hub 8, so that thus the piston and its rod are in connection with the bearing pins 41, 42, and thereby respectively, with the hubs 7 and 8, so that by movement of the piston 34 in its cylinder, the connection rods 39, 40, are connected flexibly with a radially outwardly part of the hub to permit movement of the said hubs, 7 and 8, by the piston 34 by rotation or oscillation of the said hubs 7 and 8, in opposite directions, on the exterior surface of the main rotor hub 4 as a bearing. By such movement the piston 34 is enabled to pull the air foil blades 19 and 23 from their parallel positions extending radially in one direction from main rotor hub 4, into positions such that the air foil blades 19 and 23 are located at locations which are, respectively, 120 degrees or substantially that away from the air foil blade 15 to one side and 120 degrees or substantially that away from the air foil blade 15 in the other direction, and so that thus the three air foil blades 15, 19, and 23 are substantially equi-distantly located, as so extended, radially around the main rotor hub 4. The location will occur when there is air pressure interiorly of the bore of cylinder 16 and against the interior face of the piston 34. The location of the air foil blades 15, 19, 23, in the parallel positions, as they are illustrated in Figure 1, will occur automatically, as hereinafter described, when there is no air pressure in the said bore of cylinder 16. The transverse beam member 36, as will be apparent in Figure 4, is curved, as to its arms, upwardly and downwardly, so that each arm may perform its said function.

The air foil blades 15, 19 and 23, bear, respectively, at their extreme radially outward ends, affixed thereto, jet units which are generally designated as J, J1, J2, and each of these jet units is formed generally to be of the design of ram-jet units as they are commonly known, but each has incorporated with it a pressure jet as a part of its construction, so that the unit, each such unit, is a combination of ram-jet and pressure jet, in the one unit J, J1, or J2. Each jet unit has a generally cylindrically shaped outer wall 43 which has an interior forwardly directed compression section designated 44 and has an interior rearwardly directed expansion section which is generally designated 45, and these are connected by the intermediate venturi-shaped or constricted throat section 46. The section 44 is open at its forward end by the mouth 47 into which, in its operation, atmospheric air is forced or inducted. The section 45 is at its extreme rearwardly directed end open to atmosphere by the discharge 48, so that in operation, atmospheric air may enter by mouth 47, pass through compression section 44 and be compressed therein, and pass by connection or venturi 46 to the expansion section 45 and discharge to atmosphere by way of the discharge 48, the movement of air being generally rearwardly of the direction of movement of the unit and its attached air foil blade, in operation.

There is fixed in the compression section 44, being supported by the bracket arm 49, the pressure nozzle unit 50, which at its forward end 51 is conically pointed as shown, and which at its rear end has an open mouth 52 through which the interior pressure chamber 53 will discharge in action, the discharge mouth 52 being directed rearwardly of the movement, and in the same direction as the discharge 48, discharges. The pressure chamber 53 may receive air under pressure, with the addition of fuel, by way of conduit connection 54 through which the mixture of fuel and air under pressure may pass from the mixing chamber or section 55 and to the pressure chamber 53. The mixing chamber 55 receives air under pressure from the associated conduit 31, 32 or 33, that is, from its attached air foil blade and the air pressure conduit therein. The mixing chamber 55 receives fuel sprayed under pressure from the atomizing aperture and metering aperture or passage 56, and this fuel as so metered and atomized mixes with the air under compression received by way of the pressure conduit in the associated air foil blade and the mixture as so formed passes into the pressure chamber 53 and is or may be there ignited by the spark plug or other ignition means 57, and the mixture under pressure and as heated by combustion expands and is ejected from the discharge mouth 52 into the venturi-neck or throat 46 of the jet unit, and in that throat at high velocity serves not only as a reactive motor means under pressure, but also serves to produce impulsion of the air flowing through compression section 44 to throat 46 and thus to add velocity and force to the air moving therethrough and the mixture of air and fuel or partly combusted mixture completes combustion by combustion with the air moving into throat 46 from compression section 44, and the completed combustion and gas mixture is highly heated and when it enters the expansion section 45 further expands and increases its velocity and thereby also increases its reactive force against the jet unit and thereby its propulsive effect upon the air foil blade, 15, 19 or 23 to which the jet unit is attached. There is another spark plug or other ignition means 58 which is located in the forward part of the expansion section 45 and this serves to ensure that there will be ignition if the gases are not already being combusted.

It may be noted that the air under pressure passing to pressure chamber 53 will serve to partially support combustion in the pressure chamber 53, and that when the unit operates under nearly full power or maximum power, there will be excess fuel supplied by the metering aperture 56, and there will be further combustion with the air supplied from atmosphere by way of the compression section 44, but that in such periods when there may be restricted supply of fuel, for low power, there may be complete combustion of the fuel in the pressure chamber 53, and this combustion therein serves to produce propulsion in itself and also by injection and impulsion effect upon the air received from compression section 44. The passages for the air and combustion gases, through the jet unit, should be so formed as will contribute most to effective propulsive effect upon the unit, and to that end should be so formed in view of the knowledge and practice with jet reactive means or motor means, as to produce the best effective reaction impulse and propulsion effect upon the jet unit and thereby upon the rotor unit of which it is a part.

The metering apertures 56 of the jet units J, J1, J2, are all so carefully and precisely formed that each is in flow capacity exactly equal to the flow capacity of the other such fuel metering apertures 56, and so that thus the fuel flow, under any particular fuel pressure, will be exactly the same in each fuel metering aperture 56, and thus also to each mixing chamber 55 and its associated pressure chamber 53, and thereby the jet units J, J1, J2, will be so supplied with fuel under pressure that the combustion and propulsive effect in each jet unit will be exactly equal to the combustion and propulsive effect in the other units of the rotor unit. The metering apertures are formed in a small fuel casing 59 into which the metering plug 60 with its metering aperture 56, is inserted, there being a fuel chamber 61, in which or to which the fuel flows freely and unrestrictedly from the fuel pressure conduit 62, of which there is one in each air foil blade 15, 19, or 23. All three of the fuel conduits 62, are connected, each by one flexible fuel conduit 63, to the common fuel pressure chamber 64, and the latter is a bearing means having a bearing 65 which is rotatable on the fuel pipe or standard 66 (Figure 3), so that while the latter is stationary, the chamber 64 may rotate on it as a bearing. The fuel pipe 66 is vertically placed in the axis of the bore 30 of the pylon shaft 2 and this fuel pipe 66 has a supply pipe 67 which is a branch pipe of any common fuel system, but is preferably a common supply pipe connected with the delivery 68 from a fuel pump 69 associated with the rotor unit, and this fuel pump has a by-pass pipe 70 controlled manually or by any automatic means by by-pass valve 71, so that thereby the fuel supplied by fuel pump 69 to supply pipe 67 may be controlled and proportioned to the need for power output in the rotor unit. It should be understood, that the pressure of fuel supply will vary according to the fuel supplied, as controlled by by-pass valve 71, and that thus the pressure of fuel in common supply pipe 67 will vary, according to the needed power output, and that as this pressure varies, the flow of fuel from each metering aperture 56, in the jet units, will vary according to the pressure of fuel supply, but will be in all conditions, because of the common fuel pressure, and because of the exactly equally proportioned capacity of the apertures 56, at all times, at all powers, exactly equal in each metering nozzle 56, and exactly equal, therefore, to each pressure chamber 53 of the jet units, of the rotor unit.

The fuel pump 69, may be driven in any way, but is shown, as having a drive shaft 72 which, as shown in Figure 8 is driven by a turbine unit there shown. The fuel supply and especially the metering cross-sectional area of each metering aperture or nozzle 56, should be so proportioned to the pressures under which the fuel is supplied, that the fuel supply to each jet unit of a rotor unit, will be as great as is necessary for the projected power output, but will not be greater than the maximum fuel supply, per unit of time, and per rotation at maximum speed of rotation, which can be efficiently used in the jet unit and units.

The main rotor hub 4 bears fixed thereon or on its cylinder 16, exteriorly of the latter, a pair of stops or projections 73, the function of these being to limit the forward movement, by oscillation on the hub 4, of the hubs 7 and 8 and their air foil blades 19 and 23, respectively, so that these blades will under pressure in cylinder 16, take up the positions, just approximately 120 degrees ahead of or away from the position of blade 15, so that these blades are substantially equi-distantly separated, and will maintain that equi-distantly separated positioning in the rotation of the rotor unit, as such. The blades 19, and 23, at their sections adjacent the hubs, will, when fully extended or expanded to operative positions, abut against the stops, mentioned, and thus limit further movement, relatively.

Referring to Figures 1 to 7, and Fig. 9, which has now been described in detail, the general operation of this rotor unit, is now described, as follows: It should first be observed that the unit will in condition for operation, be supplied with air under a pressure of say from fifty to one hundred pounds pressure, or even more than that, by means of an air supply pipe 74, and that this air supply pipe is connected, preferably to the air pressure discharge from the compressor section of a gas turbine, and that the air supply under pressure may be shut off or permitted by a hand valve or other control means (75 as in Figure 8), and that thus the supply of air under pressure is under control and may be initiated at any time, or shut off. In Figures 1, 2, 4 (and by solid lines in Fig. 8), the rotor unit or units, are shown as having their air foils or blades retracted into the parallel and trailing positions, in which they all trail in one direction from the axis of the rotor unit and are thus inactive, and the rotor unit is not in rotation. Assuming that the pilot of the aircraft now desires to place the rotor unit in condition for rotation, he then will open the valve 75 associated with the unit to permit air under pressure of say fifty or more pounds, to flow through the associated pipe 74, and he will also simultaneously or slightly thereafter partially or fully close the fuel by-pass control valve 71, so fuel will flow, and he will cause electric ignition current to flow to contact ring 76 and thereby to the contact brush 77, attached to rotor hub 4, and thereby to each spark plug 57 and 58 of each jet unit (electric conductors being passed through hubs and air foil blades as necessary from contact brush 77, to provide current). As soon as air pressure is effective in air supply pipe 74 and bore 30 of the unit, two things will occur: air under pressure will flow into the bore of cylinder 16 and there force the associated piston 34 radially outwardly and thereby this piston will exert pull on connecting rods 39, 40, and pull against the hubs 7 and 8 in opposite directions of rotation, however, and these hubs with their attached blades 19 and 23, will rotate in the opposite directions to the positions of active operation, equally distantly separated from blade 15 and each other; and simultaneously air under pressure will flow to mixing chambers 55 of the blades from conduits 31, 32, 33, and fuel will flow from the metering nozzles 56, and the fuel and air mixtures will flow to pressure chambers 53 and there be ignited by spark plugs 57, and combustion will ensue and be continuous, and the air under pressure and combustion gases will emerge from the jet units and cause propulsive action by reaction in the jet units, so that this reaction propulsion is effective to cause the air foil blades to move in their predetermined direction of rotation. This dual effect causes effective impulsion of the blades 19 and 23 into their equi-distantly separated positions, relative to blade 15, since not only are the blades 19 and 23 pulled by the pressure of air in cylinder 16, but each blade 19 and 23 has propulsive effect upon it by its jet unit J1, or J2, and the blade 15 has also propulsive effect upon it by its jet unit, all the propulsive effects of the jet units inducing rotation, generally in the predetermined direction of rotation of the unit, and accordingly the blades 19 and 23 are quickly placed in their predetermined active positions, and the rotor unit, its blades then properly positioned, will continue rotation as a sustentation rotor unit, its blades 15, 19, 23 providing that sustentation effect. The blades 19, 23 and their hubs are relatively stationary, in rotation, on main rotor hub 4, and the hubs 4, 7, 8, rotate as one unit and bear upwardly for sustentation, by that rotor hub 4, against the pylon shaft 2 by means of its head 3.

At any time, when the pilot desires to discontinue the sustentation effect of the rotor unit, he closes the air supply valve 75, and also stops the fuel supply by opening the fuel by-pass valve, and thereupon there is no propulsive effect from the jet units, and the air pressure in cylinder 16, automatically diminishes, and the piston 34 recedes and the blades 19 and 23 will by pressure of the slip stream air be forced from their active separated positions, to the trailing parallel and inactive positions, as shown in Figure 1. The rotor unit in this trailing condition of blades, then remains relatively stationary, and is not effective.

Referring now to Figure 8, this figure shows the mounting of four such rotor units, as have been described hereinbefore, on an aircraft which is shown as having a fixed wing W of the swept wing type fixed on a fuselage F, the latter having a rear stabilizing wing S and control rudders and ailerons and directional means for horizontal flight, generally designated as to each by letter C.

The aircraft, Figure 8, is shown to have two gas turbines or propulsion jet turbines T and T1, mounted on it, and these are associated, by means of air supply pipes 74 with the forward and rear rotor units R and R1, and also by air supply pipes 74 with the rotor units R2 and R3 so that the turbine units supply air under pressure, when desired, to the forward and rear rotor units and they also supply air, when desired to the rotor units R2 and R3. The turbines also have each a fuel pump unit 69 and this supplies fuel as controlled by fuel valves 78, 79, 80, 81, respectively, which fuel valves are in addition to the fuel by-pass valves, previously mentioned. Thus a pilot or any automatic control means may alter flow of fuel to any rotor unit. When so altered fuel flow to the other associated rotor unit will simultaneously increase, unless the fuel by-pass valve is altered. Thus the pilot or any automatic control means, may have control of fuel distribution and by this means either one of the rotor units may have increased power and sustentation effect and its associated rotor unit have diminished power so that thereby a stabilizing effect on the aircraft in slow flight or descent, may be secured, by the change in the rotative speed of any rotor unit. In take-off or for slow descent and landing, the pilot will cause the rotor units to be in the expanded condition, as described in connection with Figure 1, preferably simultaneously and will cause their rotation thereby also. For horizontal translational flight, the pilot may shut off all air flow under pressure through pipes 74 to the rotor units, and they will then take their inoperative, trailing parallel positions, in which there is no resistance to such horizontal flight of the aircraft. In such horizontal flight, the rotor units being inactive, the aircraft has no head resistance from the rotor units, with the exception of that caused by substantially the width of the hubs 4, 7, 8, and the width of blades, although the blades are then mostly behind the hubs, and not exposed frontally to air stream. The rotor units may in addition to the means described, have any means for retracting the rotors as units, into the wings or fuselage, to completely eliminate head resistance in the inactive condition, but such means are not shown, for simplicity in the illustration of the particular invention illustrated. For illustration, one rotor R, Fig. 8, is shown expanded.

The various control means or stabilizing means designated C in Fig. 8, and also the means for varying the delivery of fuel to the various rotor units designated R, R1, R2, R3, in Figure 8, constitute means for stabilizing the aircraft, not only in horizontal translational flight, but also for stabilizing the aircraft in slow descent, take off and landing with the aid of all of the said rotor units, but it may be noted that there are other stabilizing means which are now known, and such means may be incorporated with the aircraft to aid in such stabilizing of the aircraft, under any conditions.

The fuel pumps 69 are supplied with fuel from any reservoir means, carried in the aircraft, by means of the fuel supply pipes 70a, one of which may be associated with each pump means 69 of the rotor units or the aircraft power plants otherwise carried in the aircraft.

While I have shown particular devices and combinations of devices in the illustration of my invention, I contemplate that other detailed devices and combinations of devices may be utilized in the realization of my invention, without departing from the spirit and contemplation thereof.

What I claim is:

1. In an air foil rotor means; a mounting pylon shaft, a pair of air foil blades having mounting on the mounting pylon shaft at the root ends thereof to be rotatable as a unit and to be oscillatable relatively to each other by oscillative mounting at their root ends to alternative positions in one of which the air foil blades trail from the axis of the mounting pylon shaft and are substantially parallel to each other and in the other of which positions the air foil blades are separated in the circle about said axis and spaced apart from each other radially of the pylon shaft as radii thereof; a reciprocable pressure responsive element movable with respect to a pressure chamber mounted with said air foil blades on said mounting pylon shaft to be rotatable thereon with said air foil blades, connecting links between said reciprocable pressure responsive element and said air foil blades to transmit torque from said pressure responsive element to said blades to move them from the trailing parallel positions to the radially separated positions; each said blade having fixed thereon, at a substantial distance from the said axis, a jet unit; a supply of fluid under pressure, and conductive conduit means from said supply and to said pressure chamber and to said jet units of said blades to substantially simultaneously permit flow of fluid under pressure to said pressure chamber to be applied against said pressure responsive element and to permit flow of said fluid under pressure to each of said jet units.

2. In an air foil rotor means; a mounting pylon shaft, a hub unit rotatably mounted on said mounting pylon shaft; a pair of air foil blades attached each at one end oscillatively on said hub unit to be oscillative relatively to said hub unit to alternative positions in one of which the air foil blades trail from the said hub unit and are substantially parallel to each other and in the other of which positions the air foil blades are separated in the circle about said hub unit and spaced apart substantially as radii of said hub unit; a pressure chamber formed with said hub unit, a reciprocable pressure responsive element movable with respect to the pressure chamber, connecting links between said reciprocable pressure responsive element and said air foil blades to transmit torque from said pressure responsive element to said air foil blades to move them from the trailing parallel positions to the radially separated positions; each said blade having fixed thereon, at a distance from said hub unit, a jet unit; a means to supply fluid under pressure and conductive conduit means from said means to supply fluid and to said pressure chamber and to said jet units of said blades to substantially simultaneously permit flow of said fluid under pressure to said pressure chamber to be applied against said pressure responsive element and to permit flow of said fluid under pressure to each of said jet units.

3. The means as specified in claim 2, and in combination; a third air foil blade mounted on said hub unit to be fixed relatively therewith so that the said pair of air foil blades in trailing positions are relatively parallel therewith.

4. The means as specified in claim 2, and in combination; air intake means in each said jet unit permitting flow of atmospheric air from forwardly of its movement into the unit for compression therein; a discharge nozzle from each said jet unit discharging rearwardly of the jet unit in movement thereof; a fuel supply means to supply fuel under pressure and conductive means therefrom to the jet units, fuel metering nozzles one at each jet unit to discharge fuel, from the conductive means to the jet unit in measured volume proportionately equal in the jet units, and means in each jet unit to permit flow of the said fluid under pressure to the stream moving rearwardly in said jet unit to the rearward discharge from the jet unit.

5. In an air foil rotor means; a mounting pylon shaft, a main rotor hub unit rotatively mounted on said mounting pylon shaft; a pair of air foil blades each having a hub oscillatively mounted on the said main rotor hub unit to be oscillative to alternative positions in one of which the pair of air foil blades are in positions trailing from the main rotor hub unit and parallel to each other and in the other of which the said pair of air foil blades are in radially spaced positions in the circle about the said main rotor hub unit; a pressure chamber formed with the said main rotor hub unit, a reciprocable pressure responsive element movable with respect to the said pressure chamber, connecting links between said reciprocable pressure responsive element and said air foil blades to transmit torque from said pressure responsive element to said air foil blades to move them from the trailing parallel positions to the radially spaced positions; each said blade having fixed thereon at a distance from said hub unit, a jet unit, each jet unit including a combustion chamber and a discharge nozzle discharging oppositely of the direction of rotation of the rotor means; a means to supply air under pressure and conductive conduit means from said means to supply air and to said pressure chamber and to said jet units of said blades to substantially simultaneously permit flow of said air under pressure to said pressure chamber to be applied against said pressure responsive element and to permit flow of said air under pressure to the combustion chamber of each said jet unit; and means to supply fuel under pressure and conduit means therefrom and to the combustion chambers of said jet units and metering nozzle means at each jet unit to permit measured flow of fuel to the jet unit for combustion with air in the jet unit.

6. The means as specified in claim 5, and in combination; each said jet unit including an atmospheric air intake forwardly directed to receive air in rotation of the rotor means the said air intake having connection with said combustion chamber to pass said atmospheric air thereto.

7. An air foil rotor comprising: a mounting pylon, a hub unit rotatable on the mounting pylon, a plural number of air foil blades one or more of which is attached to the hub unit to be oscillative thereon; a fluid pressure motor carried on the hub unit and incorporating an actuating element responsive to fluid pressure, interconnecting means between said actuating element and said one or more oscillative blades to transmit torque from said actuating element to said oscillative blades to move them from parallel trailing positions to radially separated positions; each said air foil blade having affixed thereto remotely from said hub unit, a jet unit; means to supply fluid under pressure and conductive conduit means from said means to supply fluid under pressure and to said fluid pressure motor and to said jet units of said blades to substantially simultaneously supply fluid under pressure to said fluid pressure motor to be applied against said actuating element and to said jet units for discharge therefrom for propulsion.

8. The means as specified in claim 5 and in combination: the said pair of air foil blades being each oscillative on an axis which is coincident with the axis of the main rotor hub unit, the means to permit flow of air under pressure to said jet units and to said pressure chamber including port connections through said mounting pylon shaft and said main rotor hub unit to provide for the flow of air under pressure from said supply of air under pressure to said jet units and to said pressure chamber.

9. The device as claimed in claim 5, and: the said pair of hubs mounted on said main rotor hub being further defined as, one above the intermediate plane perpendicularly of the axis of the pylon shaft and the other below said intermediate plane, each oscillative in axial thrust retaining means formed on said main rotor hub and in axial thrust absorbing relationship thereby with said mounting pylon shaft.

References Cited in the file of this patent
UNITED STATES PATENTS

| | | |
|---|---|---|
| 2,068,774 | Smith | Jan. 26, 1937 |
| 2,385,464 | Peterson | Sept. 25, 1945 |
| 2,605,608 | Barclay | Aug. 5, 1952 |
| 2,710,067 | Pesaro | June 7, 1955 |